Oct. 16, 1934. C. PALKOWSKI ET AL 1,977,202

BORING MACHINE

Original Filed July 7, 1931 3 Sheets-Sheet 2

INVENTORS.
CONSTANTI PALKOWSKI.
STEPHAN WAGNER.
BY
ATTORNEY.

Oct. 16, 1934.   C. PALKOWSKI ET AL   1,977,202
BORING MACHINE
Original Filed July 7, 1931    3 Sheets-Sheet 3
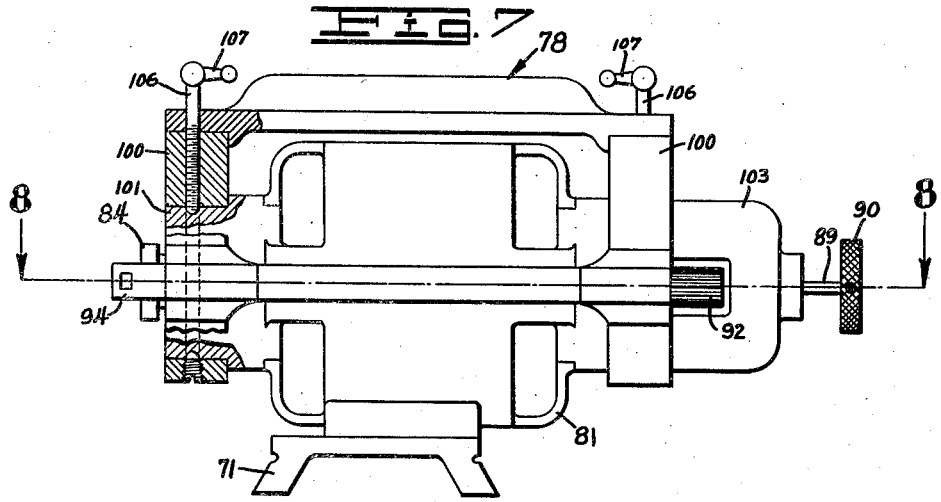
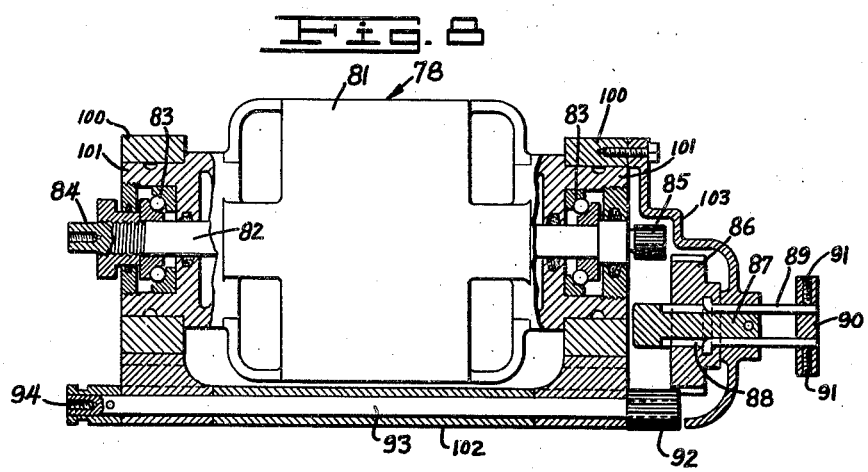
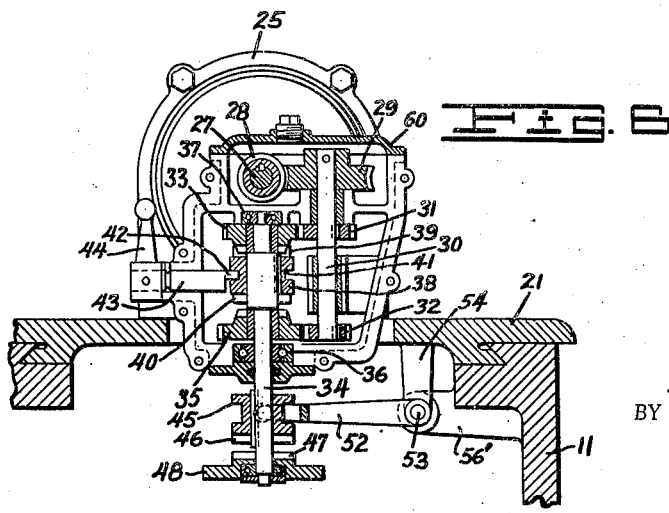
INVENTORS.
CONSTANTI PALKOWSKI.
STEPHAN WAGNER.
BY
ATTORNEY.

Patented Oct. 16, 1934

1,977,202

UNITED STATES PATENT OFFICE 1,977,202

BORING MACHINE

Constanti Palkowski and Stephan Wagner, Los Angeles, Calif.

Application July 7, 1931, Serial No. 549,228
Renewed March 13, 1934

3 Claims. (Cl. 77—22)

This invention relates to boring machines.

The general object of the invention is to provide a multiple spindle boring machine including novel means enabling a plurality of holes to be simultaneously bored in a piece of work.

A further object of the invention is to provide a boring machine including a base having a plurality of novel boring members movably mounted thereon.

A further object of the invention is to provide a boring machine including adjustable means simultaneously boring a plurality of holes in horizontal or in vertical alignment.

An additional object of the invention is to provide a novel shiftable boring element for use on a boring machine.

A further object of the invention is to provide a boring head including a plurality of spindles, one spindle being adjustably shiftable about the axis of the other spindle.

An additional object of the invention is to provide a boring machine including novel means for causing relative movement between the work and the boring members.

Other objects of the invention will be apparent from the following description taken in connection with the accompanying drawings wherein:

Fig. 6 is a section taken on line 6—6 of Fig. 5.

Fig. 7 is a side elevation of the multiple spindle boring member, and

Fig. 8 is a central sectional view showing the multiple spindle boring member.

Figure 1:
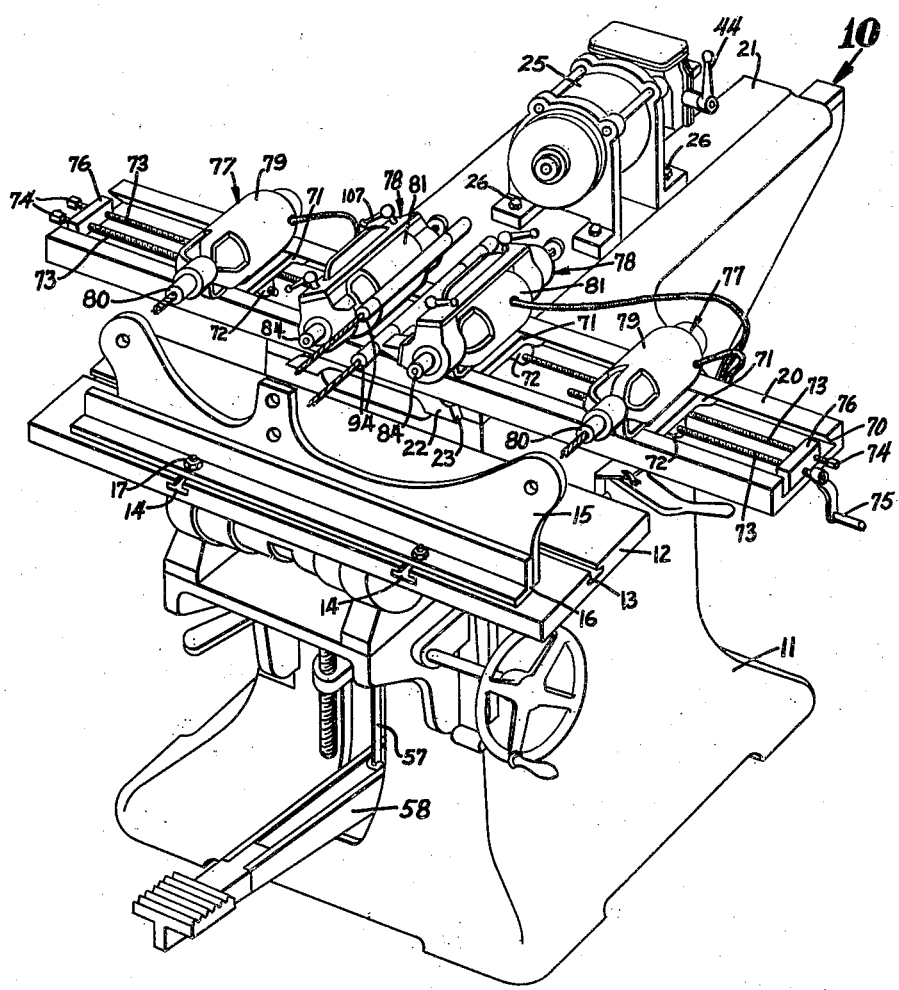
Fig. 1 is a perspective view of a boring machine embodying the features of our invention.

Referring to the drawings by reference characters we have indicated our invention generally at 10. As shown the device includes a base or standard 11 on which a work holding table 12 is mounted. This work holding table 12 is shown as provided with a longitudinal slot 13 and with transverse slots 14 for the purpose of holding centering means for the work. In the illustration shown the work 15 is held against an angle member 16 which is secured by bolts 17, the heads of which fit in the slots 14. The base 11 is provided with a tool carriage 20 which has a rearwardly extending portion 21. This carriage is provided with a guide member 22 which is beveled as at 23 to engage guides and allow the carriage to reciprocate. The carriage is provided with a motor 25 which is secured thereto by bolts 26. As shown in Fig. 6 this motor includes an armature shaft 27 on which a worm pinion 28 is mounted. This worm pinion 28 drives a worm wheel 29 which is keyed on a shaft 30. This shaft has two spur gears 31 and 32 mounted thereon. The spur gear 31 is larger than the spur gear 32 and engages a spur gear 33 which is loosely mounted on a shaft 34. The spur gear 32 engages another spur gear 35 likewise loosely mounted on the shaft 34. The shaft 34 is supported in suitable bearings 36 and 37, and keyed on the shaft we show a shiftable clutch member 38 which rotates continuously with the shaft and which has toothed portions 39 and 40 movable into engagement with the gears 33 and 35 to selectively drive these gears. The clutch member 38 is provided with a groove 41 which engages an eccentric pin 42 mounted on an operating shaft 43 and adapted to be operated by a handle 44.

The construction is such that when the motor 25 is operated it will drive the shaft 34 at either of two speeds depending upon the position of the operating handle 44.

Figure 5:
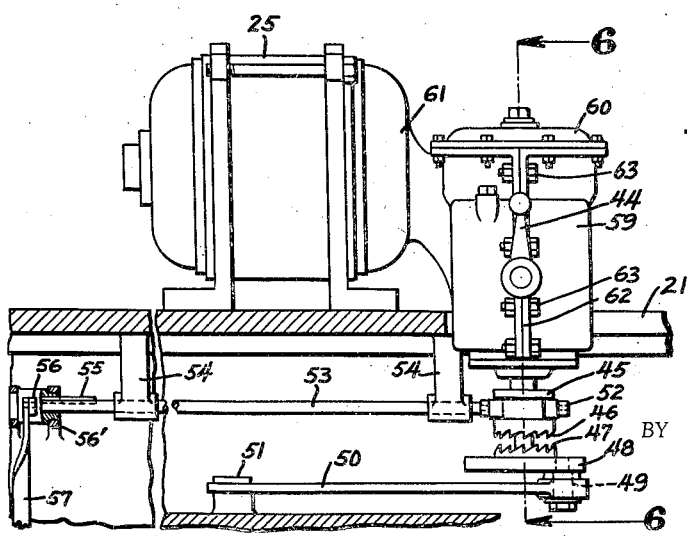
Fig. 5 is a side elevation partly in section showing the table reciprocating mechanism.

The shaft 34 is provided with a sliding clutch member 45 which is keyed to slide therealong. See Figs. 5 and 6. This clutch member includes a toothed portion 46 which is adapted to engage a companion similarly toothed portion 47 mounted on a disk 48 which includes a crank pin 49 on which a link 50 is connected at one end. The other end of the link 50 is pivoted on a boss 51 mounted on the stationary base 11. The clutch 45 is adapted to be reciprocated by a clutch lever 52 which is secured to a shaft 53. The shaft 53 is rotatably mounted in bearings 54 on the carriage 20 and is adapted to move with the table. The shaft 53 extends towards the front of the device where it is connected by a spline 55 to an arm 56 which is supported in bearings 56' on the stationary portion 11 of the device. One end of a bar 57 is pivotally connected to the arm 56 and the other end of the arm is pivotally connected to a foot lever 58 (see Figs. 1 and 5).

Thus when the lever 52 is rocked by the foot lever 58 through the medium of the bar 57, arm 56 and the shaft 53 to control the clutch portions 46 and 47 to engage the motor will cause the clutch portions 46 to cause the carriage 20 to reciprocate back and forth relative to the base 11 and thus will move the spindles towards and from the work as shown. The armature shaft 27 gears 28, 29 and associated parts for reciprocating the tool carriage are enclosed in a housing 59 which has a cover 60 thereon and which includes a motor shield 61 cast integral with half of the casing 59 which it will be noted is divided longitudinally at 62 with the portions held together by means of bolts 63.

The tool holding carriage 20 is provided with an undercut groove 70 in which the bases 71 of motor holding slides are positioned. Each of these slides is provided with a boss 72 which engages one of the threaded rods 73. The rods 73 are provided with handle engaging portions 74 which receive handles 75 for turning the rods. The rods 73 are mounted to rotate without axial movement in blocks 76 and accordingly when the rods are rotated the slides 71 will be moved in their guideways to their proper adjusted position.

We have shown the outermost slides 71 as provided with boring members 77 while the inner slides are provided with boring members 78 but it will be understood that the number of boring members and their arrangement may be varied to suit the circumstances under which the machine operates. The boring members 77 are each shown as comprising a motor driven unit 79 which operates a drill chuck 80. The drilling members 78, as shown, include a motor 81, the armature shaft 82 of which is mounted in bearings 83. This armature shaft is provided with a boring spindle or chuck 84 at one end thereof, while the opposite end thereof is provided with pinion 85 which meshes with a gear 86 slidably mounted on a shaft 87. This shaft is provided with opposed keyways 88 in which square bars 89 slide. These bars are turned outwardly to engage the gear 86 and are provided with a head 90 which is held in place by threaded pins 91.

The gear 86 meshes with a pinion 92 keyed to a shaft 93 the free end of which is provided with a boring spindle or chuck 94. The construction is such that when the motor 81 is actuated the boring spindle 84 will be rotated and when the head 90 is pushed inwardly the boring spindle or chuck 94 will be rotated.

In order that the boring spindle 94 may be bodily moved about the axis of the drilling spindle 84 we mount a pair of rotatable sleeves 100 on collars 101 on the casing of the motor 81. These sleeves support a bracket 102 which affords a bearing for the shaft 93. The sleeve 100 at the rear of the motor also supports a casing 103 which is disposed about the gears 85 and 86.

The bracket 102 and casing 103 both rotate about the axis of the spindle 84 and are held in place by clamping screws 106 which are actuated by handles 107.

Figure 2:
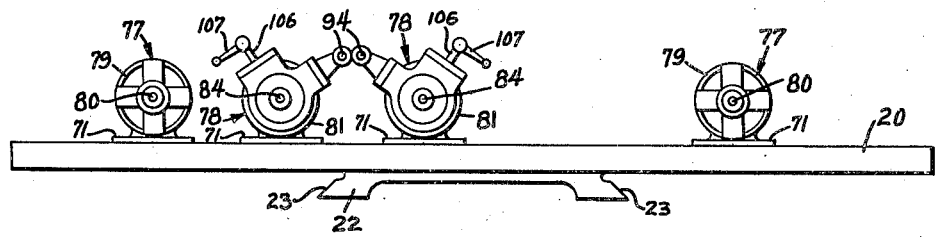
Fig. 2 is a front elevation showing a sliding table with the adjustable boring members thereon.
Figure 3:
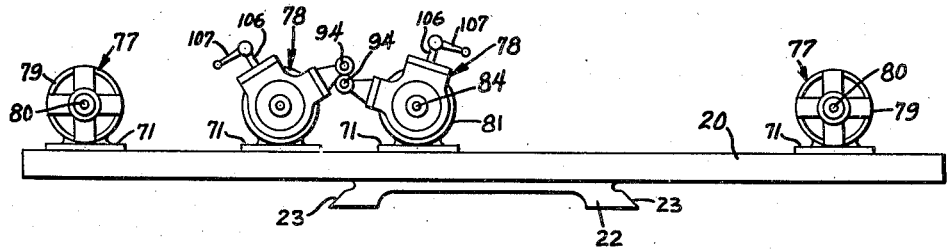
Figs. 3 and 4 are views similar to Fig. 2 showing various positions of the boring members.
Figure 4:
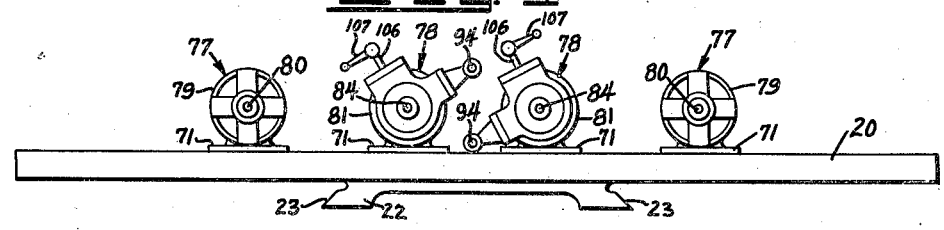

The spindles 80 and 84 preferably are disposed at a uniform distance above the top of the table 12 so that they are in axial, horizontal alignment, while the spindles 94 may be shifted as shown in Fig. 2 and held in position above the line of the spindles 80 and 84 or they may be held as shown in Figs. 3 and 4 or in any other desired manner so that a plurality of holes may be drilled quickly and economically and with but slight adjustment of parts.

Having thus described our invention we claim:

1. In a boring machine, a housing having a motor therein, said motor including an armature shaft, a drill chuck arranged on said armature shaft, said housing having a collar supported thereon at each end of said motor, a sleeve supported by each of said collars, a bracket supported by said sleeves, a drilling spindle supported by said bracket, a chuck supported by said drilling spindle, a gear on said armature shaft, a gear on said drilling spindle shaft, a slidable idle gear mounted to rotate on an axis shiftable with said sleeves, said idle gear being adapted to engage said drilling spindle gear and being shiftable into and out of engagement with said motor gear, means to shift said idle gear and means to lock said bracket with said drilling spindle in adjusted position.

2. In a boring machine, a housing having a motor therein, said motor including an armature shaft, a drill chuck arranged on said armature shaft, a bracket, means to support the bracket for shifting movement about the armature shaft of said motor, a drilling spindle supported by said bracket, a chuck supported by said drilling spindle, a gear on said armature shaft, a gear on said drilling spindle shaft, a slidable idle gear mounted to rotate on an axis shiftable with said bracket, said idle gear being adapted to engage said drilling spindle gear and being shiftable into and out of engagement with said armature shaft gear, and means to shift said idle gear.

3. In a boring machine, a base, a boring member mounted on said base, said boring member including an armature shaft, a drill chuck arranged on said armature shaft, a collar supported at each end of said motor, a sleeve supported by each of said collars, a bracket supported by said sleeves, a drilling spindle supported by said bracket, a chuck supported by said drilling spindle, a gear on said armature shaft, a gear on said drilling spindle shaft, a slidable idle gear mounted to rotate on an axis shiftable with said sleeves, said idle gear being adapted to engage said drilling spindle gear and being shiftable into and out of engagement with said motor gear, means to shift said idle gear and means to lock said brackets with said drilling spindle in adjusted position.

CONSTANTI PALKOWSKI.
STEPHAN WAGNER.